United States Patent [19]

Block et al.

[11] Patent Number: 4,708,191

[45] Date of Patent: Nov. 24, 1987

[54] APPARATUS FOR INDICATING THE LEVEL IN METALLURGICAL VESSELS BY ELECTROMAGNETIC MEANS

[75] Inventors: Franz-Rudolf Block, Roetgen; Wolfgang Theissen, Würselen; Urs Basler; Branislav Pesovic, both of Steinhausen, all of Fed. Rep. of Germany

[73] Assignee: Stopinc Aktiengesellschaft, Baar, Switzerland

[21] Appl. No.: 835,852

[22] PCT Filed: Jul. 3, 1985

[86] PCT No.: PCT/EP85/00319

§ 371 Date: Feb. 24, 1986

§ 102(e) Date: Feb. 24, 1986

[87] PCT Pub. No.: WO86/00987

PCT Pub. Date: Feb. 13, 1986

[30] Foreign Application Priority Data

Jul. 26, 1984 [DE] Fed. Rep. of Germany ....... 3427563

[51] Int. Cl.⁴ .................... B22D 2/00; B22D 11/18
[52] U.S. Cl. .................... 164/150; 164/449; 164/453; 164/457; 73/290 R; 324/204
[58] Field of Search ............... 164/449, 155, 156, 150, 164/453, 457; 73/290 R, 304 R; 324/204

[56] References Cited

U.S. PATENT DOCUMENTS

| 4,144,570 | 3/1979 | Wagner . | |
| 4,144,756 | 3/1979 | Linder | 73/290 R |
| 4,212,342 | 7/1980 | Linder et al. | 164/449 |
| 4,279,149 | 7/1981 | Block | 73/290 R |
| 4,441,541 | 4/1984 | Block | 164/453 |

FOREIGN PATENT DOCUMENTS

| 0010539 | 10/1979 | European Pat. Off. | 164/449 |
| 60800 | 9/1982 | European Pat. Off. | 164/449 |
| 2247295 | 4/1973 | Fed. Rep. of Germany . | |
| 2345932 | 3/1975 | Fed. Rep. of Germany . | |
| 2631533 | 2/1977 | Fed. Rep. of Germany . | |
| 2722214 | 12/1977 | Fed. Rep. of Germany . | |
| 3427563 | 2/1986 | Fed. Rep. of Germany . | |
| 2352287 | 12/1977 | France | 164/449 |
| 1585211 | 2/1981 | United Kingdom | 164/449 |

Primary Examiner—Nicholas P. Godici
Assistant Examiner—Samuel M. Heinrich
Attorney, Agent, or Firm—Wenderoth, Lind & Ponack

[57] ABSTRACT

An apparatus for indicating by electromagnetic means the level in metallurgical vessels means with transmitting and receiving coils which combined into a measuring unit having a transmitting coil which extends in the direction of the fill height and at least two receiving coils assigned thereto and staggered vertically. This simplifies and facilitates the assembly work.

10 Claims, 7 Drawing Figures

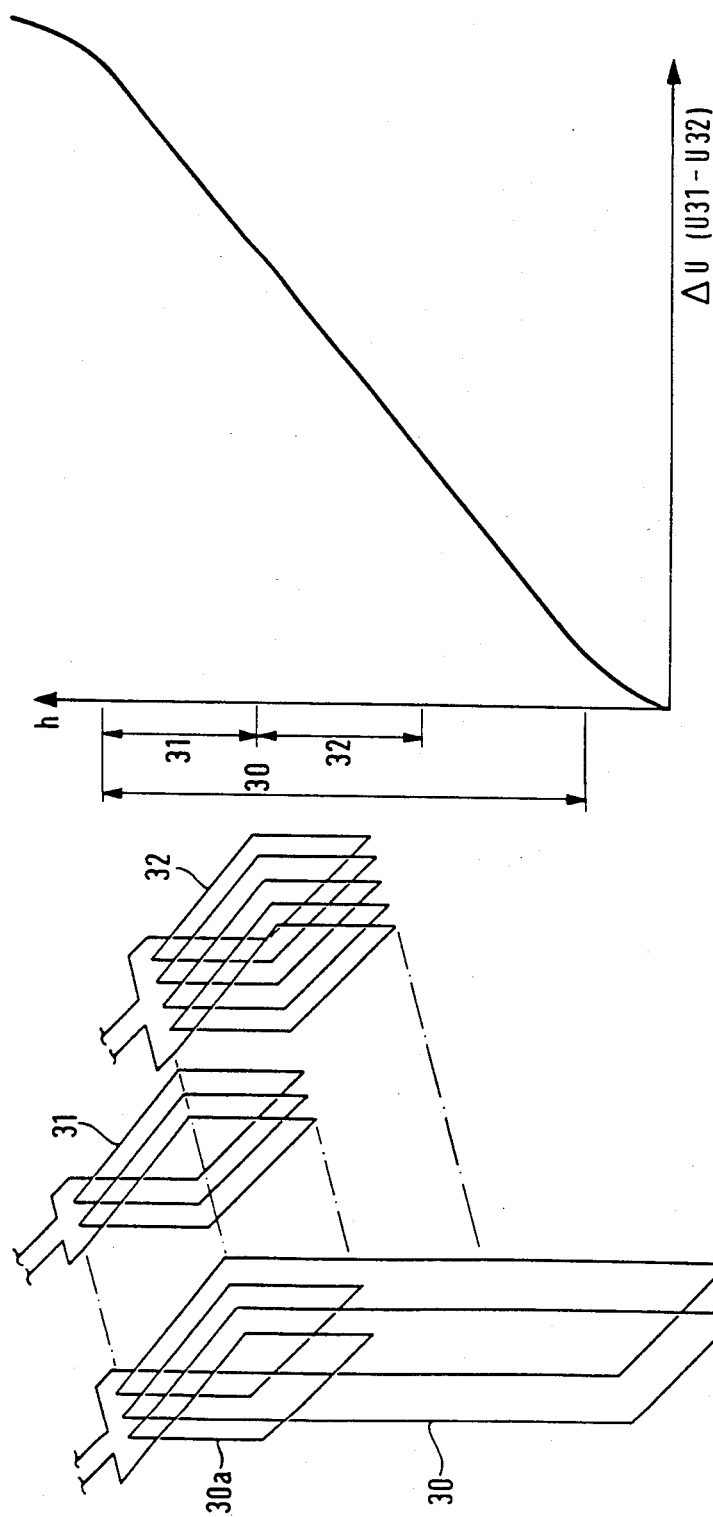

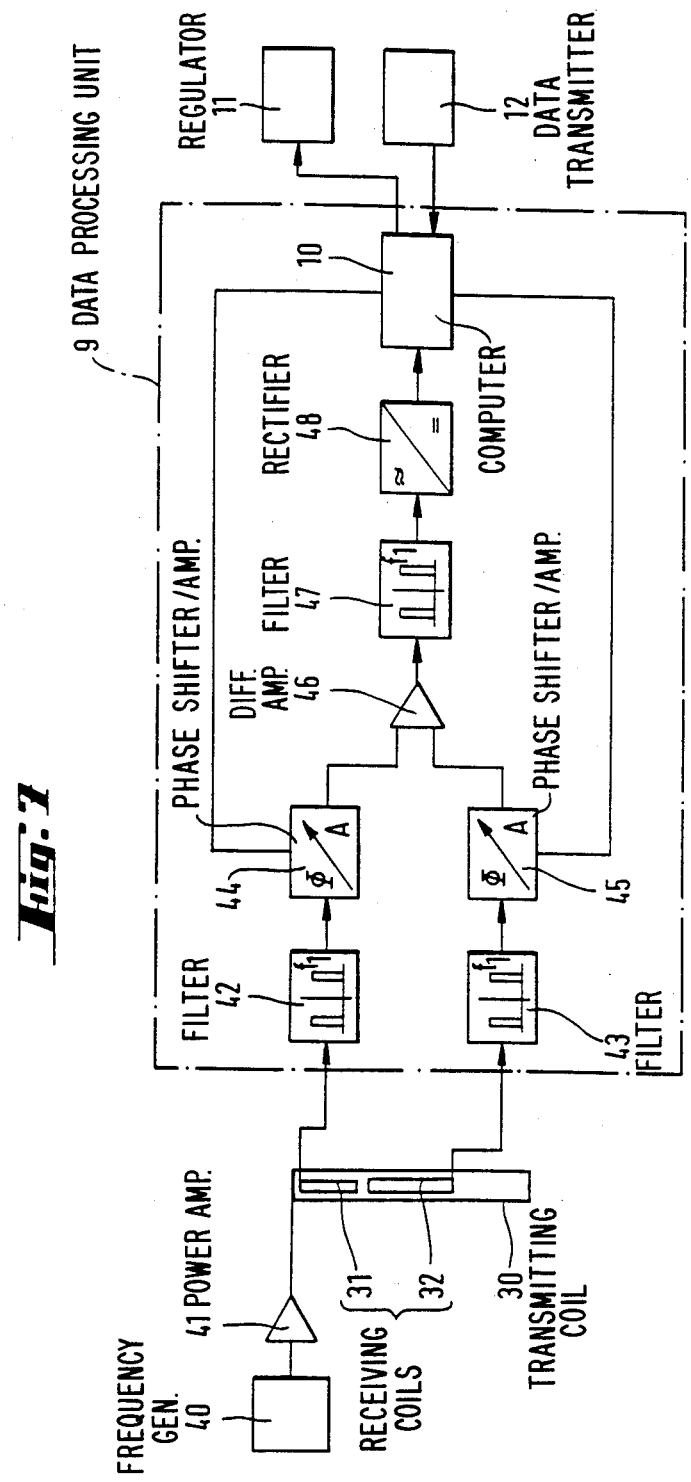

APPARATUS FOR INDICATING THE LEVEL IN METALLURGICAL VESSELS BY ELECTROMAGNETIC MEANS

BACKGROUND OF THE INVENTION

The invention relates to an apparatus for indicating the level in metallurgical vessels, more particularly tundishes for the casting of molten steel into ingot molds, comprising electromagnetic coils that are arranged in the wall of the vessel with axes directed to the bath and are developed as primary or transmitting coils connected to alternating current and as secondary or receiving coils, and whose alternating voltages induced in direct relation to the bath level serve as input signals for a data processing unit.

In this type of device, such as, for example the device disclosed in Printed West German Unexamined Patent Application No. OS 27 22 214 and U.S. Pat. No. 4,144,576, the transmitting coil and the receiving coil are provided separately in the refractory lining at various points of the vessel, e.g. in the area of the corner of a melting furnace on two adjoining or two opposing walls of a vessel. With this design, a special cable consisting of an inner wire, a heat-resistant ceramic insulation and an outer steel pipe are used to form the coils. In principle, separate coil arrangements are relatively expensive and cumbersome during assembly, because each coil must be mounted separately at the assigned point of the vessel lining, whereby the cooperating coils must be aligned accurately to each other so as to obtain usable output signals.

SUMMARY OF THE INVENTION

The present invention has as its object the simplification of the apparatus for indicating with a higher degree of accuracy the level in metallurgical vessels through better design and arrangement of transmitting and receiving coils.

This object is achieved according to the present invention by providing transmitting and receiving coils combined into a measuring unit having at least one transmitting coil extending in the direction of the fill height and at least two height-adjustable receiving coils assigned thereto. Thus, the transmitting and receiving coils can be housed with ease and with less effort in the vessel during the construction of the refractory lining, since the coils have already been combined into a measuring unit before installation and are aligned from the functional standpoint to the metallurgical vessel to be fitted out. Thus, an adjustment of the individual coils in special positions in the vessel wall is no longer required. In this case, the term measuring unit is to be understood as a coil unit combined with means for holding, binding, connecting or the like and which is prefabricated with respect to particular, special measurement-engineering requirements of a metallurgical vessel.

According to the invention, a measuring unit has proved to be especially advantageous consists of a system formed of bare wires on insulators and comprised of transmitting and receiving coils and refractory material with electrically insulating properties poured therearound. In this way, a structural unit can be fabricated which can easily be inserted into the refractory lining of the vessel with simple means and which can appropriately be mounted in the back lining using mineral wool, easily detachable mortar or the like in order to facilitate the separation of the measuring unit during the renewal of the vessel lining. It has also proved to be advantageous to use a frame or a shape which carries the transmitting and receiving coils and which consists of a fireproof, electrically insulating material and guide slots, e.g., in the form of cracks in which the coil wires are embedded and can be embedded and can be filled in with a mortar equivalent to the refractory material.

In particular, a measuring unit is recommended which has a transmitting coil with a field flux that is different in the direction of the fill height and in which the receiving coils are arranged in different field-flux areas of the transmitting coil. In this way, the characteristic curve on which the voltages are plotted can rise substantially linearly. This means that the strength of the measuring signal increases as the fill level rises.

Besides the preferably rectangular form, both the transmitting and the receiving coils can also have turns that are shaped differently. More particularly, in order to obtain a different field flux within a transmitting coil, which is preferably accomplished with extra secondary turns, one can also use to advantage, for example, turns with a triangular shape and with a field flux that decreases toward the tip of the triangle.

BRIEF DESCRIPTION OF THE DRAWINGS

The invention will now be described with reference to two embodiments shown in the accompanying drawings, in which:

FIG. 5 is an exploded view of a special embodiment of the coil system of the measuring unit:

FIG. 6 shows a characteristic curve of the coil system in FIG. 5, and

FIG. 7 shows the wiring diagram of an electronic system for a measuring unit with the coils shown in FIG. 5.

DESCRIPTION OF THE PREFERRED EMBODIMENT

Figure 1:
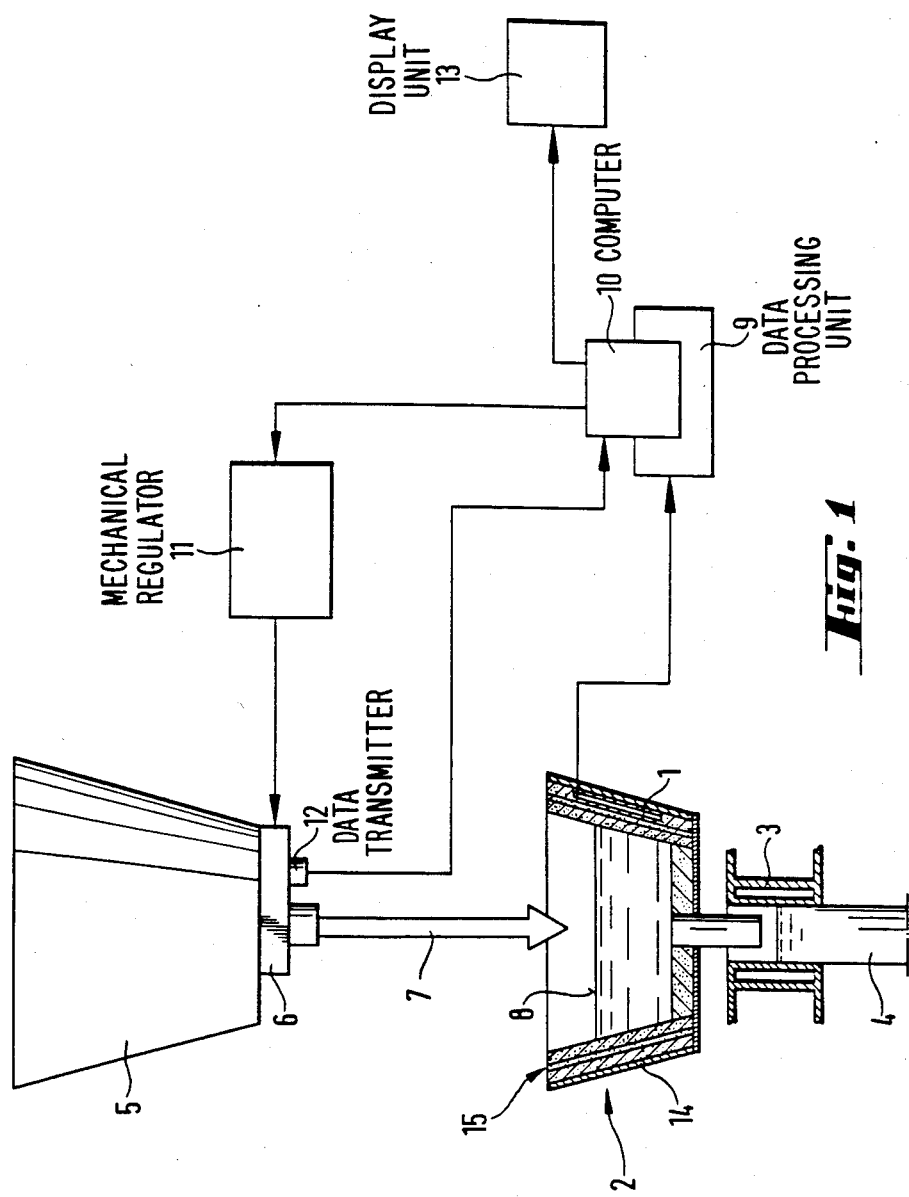
FIG. 1 is a schematic representation of the control of the stream of molten steel from a ladle into a tundish.

In the level indicator illustrated in FIG. 1, the reference numeral 1 refers to the new measuring unit provided on a tundish 2 for the casting of molten steel into ingot molds 3, from which the cooled melt is drawn off in the form of a strand 4. For its part, the tundish 2 receives the molten steel from a ladle 5 having a stopper 6 used to control the pouring stream 7 in direct relation to the height of the steel surface 8 in the tundish 2. To this end, an electronic data processing unit 9 with an associated computer 10 is series-connected to the measuring unit 1. This computer 10 controls with the stopper 6 the coupled mechanical regulator 11. A data transmitter 12 reports back to the computer for evaluation the degree of the opening or closing position of the stopper 6. This computer further serves, for example, for the control of a display unit 13 and also, in a manner not shown, for the triggering of alarms, for the automatic charging, or also for the control of the swivelling tower carrying the steel ladle 5, etc.

Figure 2:
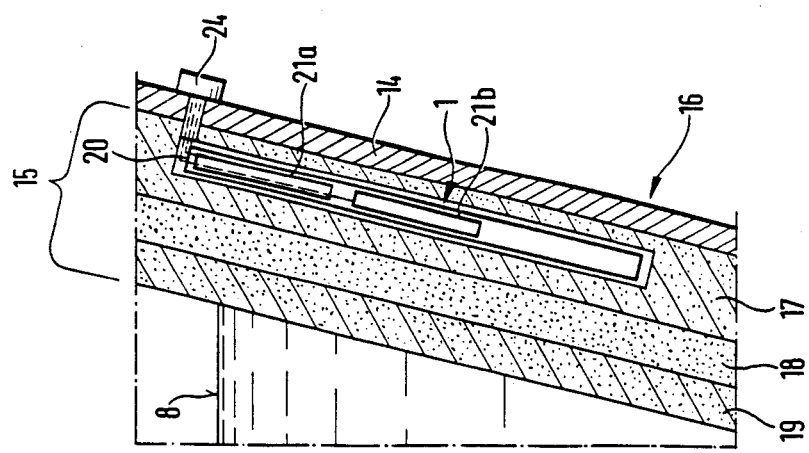
FIG. 2 is a section, on a larger scale, through the wall of the tundish with the measuring unit installed.

The tundish 2 has an outer steel jacket 14 and a refractory lining 15 which, as can be seen in FIG. 2, consists, in the circumferential wall 16, of a back lining 17 in contact with the steel jacket 14, a sand layer 18, as well as an inner lining 19. In the back lining 17 is embedded the measuring unit 1 by means of an easily detachable circumferential layer not shown herein, so that protection is afforded when the inner lining 19 is worn out and easy removal is possible.

Figure 4:
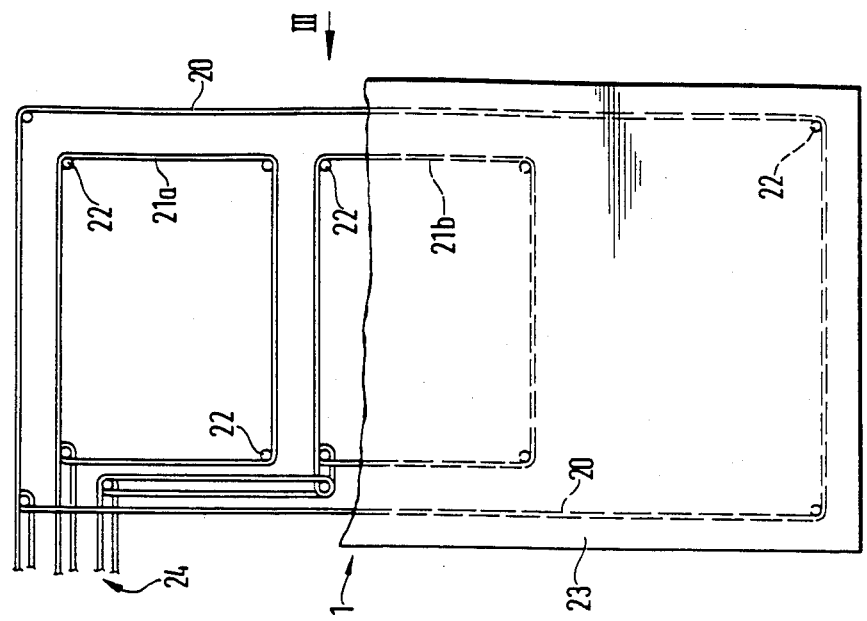
FIG. 4 is a side elevational view of the measuring unit in FIG. 3.
Figure 3:
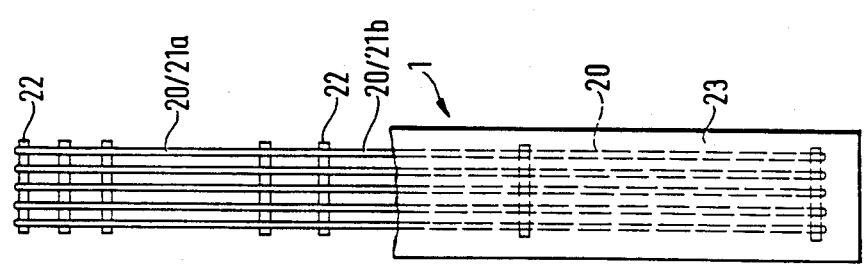
FIG. 3 shows a broken-away measuring unit viewed in the direction of the coil system.

According to FIGS. 2 to 4, the measuring unit 1 consists of a transmitting coil 20 with axes directed substantially parallel to the bath level 8 and receiving coils 21a, b staggered therein in the direction of the fill height, i.e. covering various surface areas of the transmitting coil 20. The coil system 20, 21 has bare wires that are wound on insulators 22 into a coil structure 20, 21, 22 which is poured over with a refractory, electrically non-conducting material 23, for which purpose the coil structure 20, 21, 22 is removably secured in a casing, with the wire ends 24 being held in the manner required for connection, whereupon the pourable refractory material 23 is filled in. After solidification of the material 23, the completed measuring unit 1 containing both the transmitting and receiving coils 20, 21 can be removed from the casing and used in a simple way on metallurgical vessels during the construction of the refractory lining. Several units 1 may also be provided, although in most cases the arrangement of a single measuring unit coupled with an electrical connection 24 in the circumferential wall 16 of the vessel 2 is sufficient.

The measuring unit 1 equipped with the coil system 20, 21 acts in such a way that, when the tundish 2 is empty, the overall voltage of the receiving coils 21 a, b is zero or can be equalized to zero by means of the series-connected electronic system. Appropriate voltages are induced when the bath level 8 rises. Instead of the two secondary coils plotted, a larger number of secondary coils can also be used. In particular, one will have recourse thereto if "calibration marks" are to be measured. In this case, calibration marks are voltages—usually crossover points—assigned to special fixed heights. These voltages are largely independent of the abrasive action of the refractory lining. The voltages resulting in calibration marks are obtained from linear combinations of the amounts of the secondary voltages that, preferably, have previously been equalized.

The system depicted in FIG. 5 is a special construction of the coil system 20, 21 illustrated in FIGS. 2 to 4. In this system, the rectangular transmitting coil 30 manufactured of two turns has in the upper third an extra coil 30a in which is arranged a receiving coil 31 with three turns, while a second receiving coil 32 with five turns is located in the middle of the transmitting coil 30. Equipped with such a coil system 30, 30a, 31, 32 there result for the measuring unit 1 differential voltages $\Delta U$ according to the characteristic curve shown in FIG. 6, which rises linearly in the vertical area of the transmitting coil 30, within which the areas of the receiving coils 31 and 32 are located. This means that the differential voltage induced in the receiving coils 31, 32, and thereby the measuring signal, runs in proportion to the height h of the bath level 8.

As apparent from FIG. 7, the electronic system pertaining to the measuring unit 1 with a coil system 30, 31, 32 has a frequency generator 40 which supplies an electric current with the desired frequency, which is 10 kHz for the embodiment of the invention, to the transmitting coil 30 by means of a power amplifier 41. Electrical voltages are induced in the receiving coils 31 and 32, on the one hand directly from the fields of the transmitting coil 30 and, on the other, from the fields of those currents that arise in the molten metal or in the electrically conducting structure of the tundish 2. In the data processing unit 9, the induced voltages of the receiving coils 31 and 32 are routed to a differential amplifier 46 via filters 42 and 43 as well as phase shifter and adjustable amplifiers 44 or 45. The output signal of the differential amplifier 46 is filtered once again in a filter 47, then rectified in a rectifier 48. The rectified signal is taken over by the computer 10 that controls the regulator 11 governing the height of the bath level 8 of the tundish 2 via the stopper 6 of the steel ladle 5.

Before filling the molten steel into the tundish 2, the two voltages in the phase shifters and amplifiers 44, 45 induced in the receiving coils 31, 32 are mutually equalized to zero and reinforced, so that when the vessel 2 is empty, the measured variable is zero. As soon as the molten steel has been filled in, the measuring unit 1 continually supplies voltages to the data processing unit 9, which delivers a corresponding actual value of the bath level 8 to the computer 10. The computer 10 compares the actual value with a stored nominal value and properly controls the stopper 6 of the steel ladle 5 in order to control the flow of the molten steel to the tundish 2. In the process, the actual position of the stopper 6, i.e., the degree of its opening or closing position, is detected by the data transmitter 12 and reported back to the computer 10 for evaluation.

When the inner lining 19 of the tundish 2 is exposed to considerable wear, other devices may be provided in the computer 10 which make allowance for the resulting changes in the distance between the measuring unit 1 and the inner wall of the tundish 2 and, thereby, possible differences between the measured bath levels and the effective bath levels during the measuring of the fill height. Thus, for example, depending on the arrangement of the secondary coils, sinusoidal signals are additionally generated whose crossover points serve as calibration marks, because here, irrespective of the changes in the aforesaid distance, the signal values of the bath levels remain constant. By means of these calibration marks, changes in said distance can be detected by the computer 10 and corrective values can be formed, with which the effective bath levels can then be determined.

We claim:

1. An apparatus for measuring the filling level of a molten metal bath contained within a metallurgical vessel, including electromagnetic coils arranged in a vessel wall, wherein transmitting and receiving coils are aligned with respect to a preselected height of the molten metal bath, comprising at least one transmitting coil and at least two receiving coils which are staggered side by side relative to one another in a common plane in the casting direction, said receiver coils being surrounded by said transmitter coil and said coils forming a measuring unit that is insertable as a modular unit into a refractory lining of said vessel, the axes of said transmitting and receiving coils being substantially parallel to the surface of said molten metal bath.

2. An apparatus as set forth in claim 1, wherein said measuring unit consists of a system formed of bare wires which includes said transmitting coils and receiving coils and which has an electrically insulating refractory material disposed therearound.

3. An apparatus as set forth in claim 1, wherein said measuring unit includes an electrically insulating refractory material element with guide slots having wires forming said coils arranged therein.

4. An apparatus as set forth in claim 2, wherein said measuring unit is inserted into a permanent lining of said metallurgical vessel by means of readily detachable materials.

5. An apparatus as set forth in claim 1, wherein an alternating current in the 10-kHz range is applied to said transmitting coil.

6. An apparatus as set forth in claim 1, wherein said transmitting coil has a field flux which varies in the casting direction and said receiving coils are arranged in areas of said transmitting coil having different field fluxes.

7. An apparatus as set forth in claim 6, wherein said transmitting coil has a field flux which is stronger in the area of an optimum height of said molten metal surface and in weaker and stonger field flux areas thereof, said receiving coils having different numbers of turns are each respectively arranged.

8. An apparatus as set forth in claim 7, wherein said transmitting coil is provided with secondary windings so as to cause an increased field flux.

9. An apparatus as set forth in claim 1, wherein input signals are stored in a computer of a data processor and calibration marks for certain heights of said bath level and correction values for output signals are formed in order to compensate for wear of an inner lining of said vessel and thereby compensate for variations in the distance between said bath level and said measuring unit.

10. An apparatus as set forth in claim 8, wherein input signals are stored in a computer of a data processor and calibration marks for certain heights of said bath level and correction values for output signals are formed in order to compensate for wear of an inner lining of said vessel and thereby compensate for variations in the distance between said bath levels and said measuring unit; and wherein the number of secondary windings is increaed such that a determination that said bath level height exceeds said certain heights of said calibration marks is sufficient to determine said bath level height.

* * * * *